United States Patent
Vogel

(10) Patent No.: US 11,231,596 B2
(45) Date of Patent: Jan. 25, 2022

(54) EYEWEAR HEAD GRIPS

(71) Applicant: Frank Vogel LLC, Boulder, CO (US)

(72) Inventor: Frank Vogel, Boulder, CO (US)

(*) Notice: Subject to any disclaimer, the term of this patent is extended or adjusted under 35 U.S.C. 154(b) by 125 days.

(21) Appl. No.: 16/444,159

(22) Filed: Jun. 18, 2019

(65) Prior Publication Data

US 2020/0400970 A1    Dec. 24, 2020

(51) Int. Cl.
  *G02C 5/14*    (2006.01)
  *G02C 5/16*    (2006.01)
  *G02C 5/20*    (2006.01)

(52) U.S. Cl.
  CPC .............. *G02C 5/143* (2013.01); *G02C 5/16* (2013.01); *G02C 5/20* (2013.01)

(58) Field of Classification Search
  CPC . G02C 5/14; G02C 5/143; G02C 5/16; G02C 5/20; G02C 3/00
  USPC ........ 351/123, 111, 115, 116, 118, 119, 121, 351/41, 158
  See application file for complete search history.

(56) References Cited

U.S. PATENT DOCUMENTS

| | | | |
|---|---|---|---|
| 3,018,687 A | 1/1962 | Leo | |
| 5,000,558 A | 3/1991 | Blackstone | |
| 5,471,258 A | 11/1995 | Hsieh | |
| 5,631,718 A | 5/1997 | Markovitz et al. | |
| 5,666,181 A | 9/1997 | Conway | |
| 5,969,788 A | 10/1999 | Largura | |
| 6,278,788 B1 | 8/2001 | Landis et al. | |
| 6,588,895 B2 | 7/2003 | Pointet | |
| D523,061 S | 6/2006 | Asman et al. | |
| 7,628,484 B2 | 12/2009 | Lamontagne et al. | |
| D708,663 S | 7/2014 | Huang | |
| 8,882,263 B2 | 11/2014 | Tsai | |
| 9,188,795 B1 | 11/2015 | Chin | |
| 9,465,232 B2 * | 10/2016 | Jirsa ....................... G02C 11/02 |
| 2014/0375947 A1 | 12/2014 | Park et al. | |
| 2016/0266402 A1 | 9/2016 | Gochenour et al. | |

OTHER PUBLICATIONS

International Search Report and Written Opinion for PCT/US20/37175, United States Patent Office, Blaine L. Copenheaver, dated Oct. 15, 2020.

* cited by examiner

*Primary Examiner* — Hung X Dang

(74) *Attorney, Agent, or Firm* — MP Patents, LLC

(57) ABSTRACT

Secure eyewear includes a face piece and a temple piece. The face piece includes a first side, a second side and a nose rest therebetween. The temple piece extends from a first end coupled with the first side and/or the second side of the face piece to a second end and includes a first extension. The first extension is configured to, with the nose rest supported by a nose of a user and the first temple piece resting on a first ear of the user, selectively grip a back of a head of the user by transitioning between states.

13 Claims, 7 Drawing Sheets

EYEWEAR HEAD GRIPS

TECHNICAL FIELD

The present disclosure pertains to eyewear and, in particular, to maintaining eyewear in position on the head of a user.

SUMMARY

The disclosure describes an eyewear system including a face piece and first and second temple pieces. The face piece includes a first side, a second side and a nose rest therebetween. The first temple piece extends from a first end hingedly coupled with the first side of the face piece to a second end and further includes a first extension configured to, with the nose rest supported by a nose of a user and the first temple piece resting on a first ear of the user, selectively contact a back of a head of the user. The second second temple piece extends from a first end hingedly coupled with the second side of the face piece to a second end and includes a second extension configured to, with the nose rest supported by the nose of the user and the second temple piece resting on a second ear of the user, selectively contact the back of the head of the user.

The disclosure further describes an eyewear securing system including a face piece and first and second head grips. The first head grip is hingedly coupled with the face piece and is configured to toggle between a releasing configuration and a gripping configuration. The second head grip is hingedly coupled with the face piece remote from the first extension and is configured to toggle between a releasing configuration and a gripping configuration.

Still further, the disclosure describes secure eyewear. The secure eyewear includes a face piece and a temple piece. The face piece includes a first side, a second side and a nose rest therebetween. The temple piece extends from a first end coupled with the first side and/or the second side of the face piece to a second end and includes a first extension. The first extension is configured to, with the nose rest supported by a nose of a user and the first temple piece resting on a first ear of the user, selectively contact a back of a head of the user by transitioning between convex and concave curvatures.

BRIEF DESCRIPTION OF THE FIGURES

The summary above, as well as the following detailed description of illustrative embodiments, is better understood when read in conjunction with the appended drawings. For the purpose of illustrating the disclosure, example constructions are shown in the drawings. However, the disclosure is not limited to specific methods and instrumentalities disclosed herein. Moreover, those having ordinary skill in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

Figure 1:
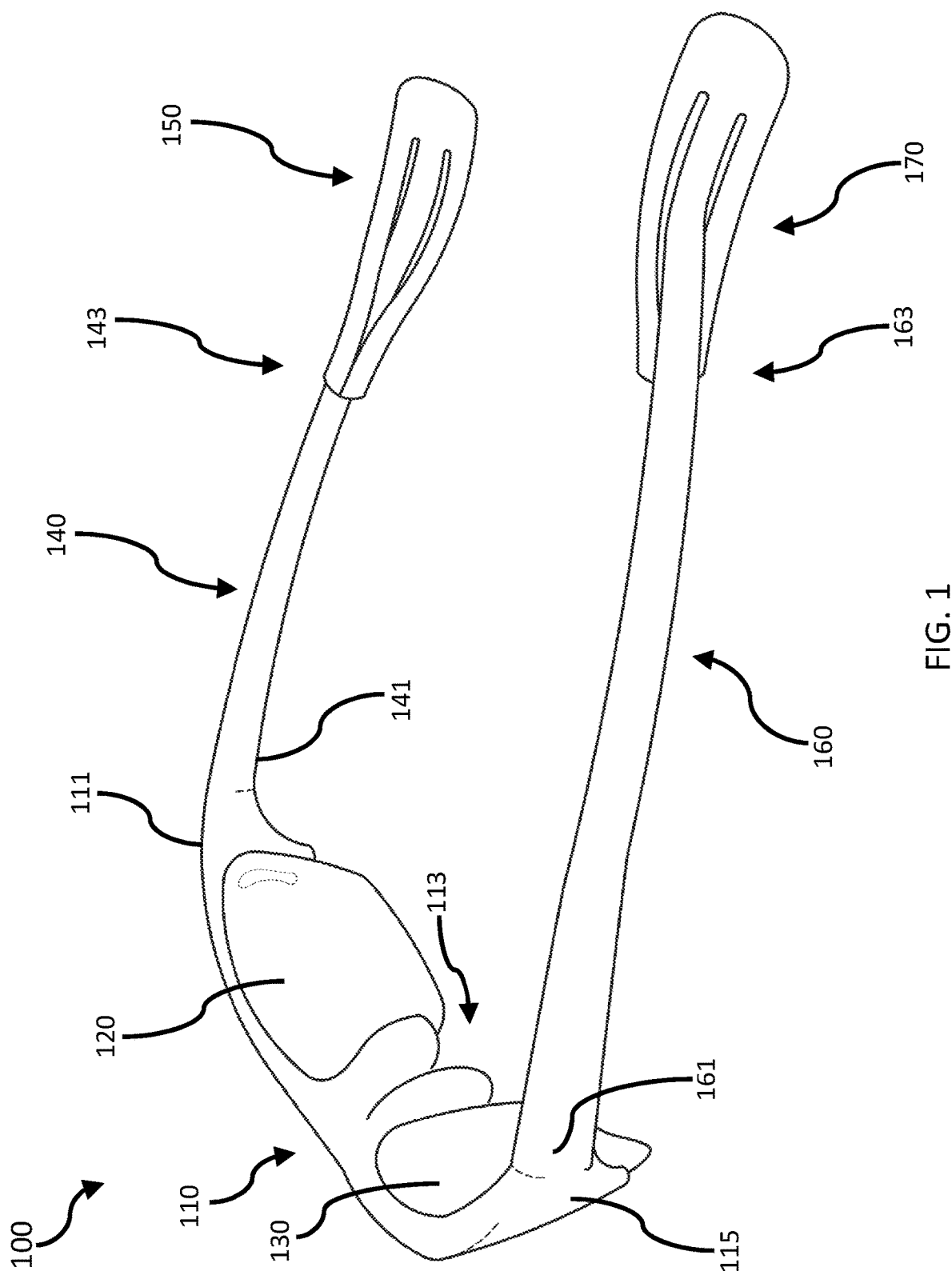
FIG. 1 illustrates a right side, top perspective view of an example eyewear system with example extensions in a releasing configuration.
Figure 2:
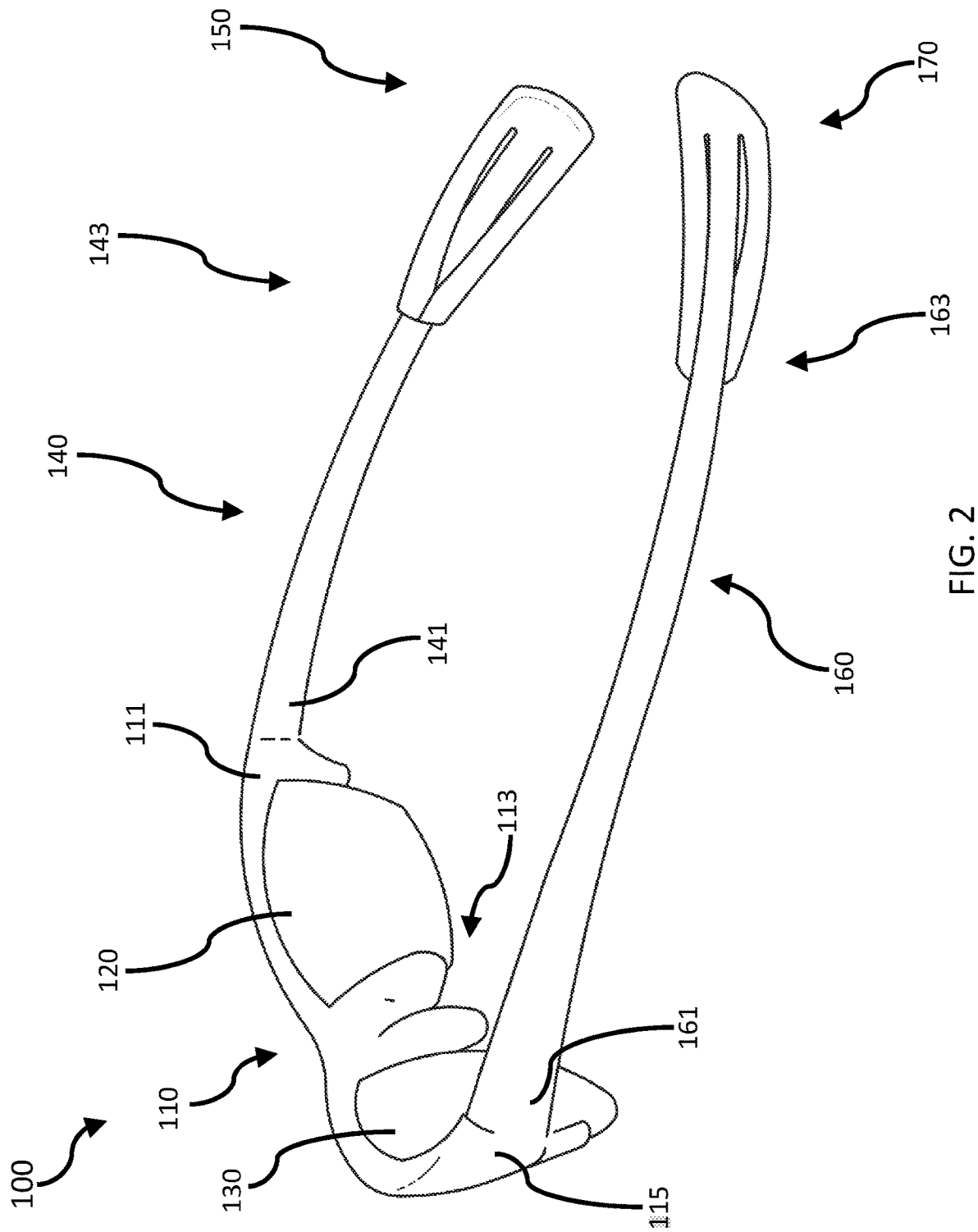
FIG. 2 illustrates a right side, top perspective view of the example eyewear system of FIG. 1 with the example extensions in a gripping configuration.

The following detailed description illustrates embodiments of the disclosure and manners by which they can be implemented. Although the best mode of carrying out disclosed systems, apparatuses and methods has been described, those of ordinary skill in the art would recognize that other embodiments for carrying out or practicing disclosed systems, apparatuses and methods are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

For eyewear such as corrective glasses, safety glasses and sunglasses, a given model may be produced as one-size-fits-all or, if provided in more than one size, may not be produced in enough sizes to accommodate the full range of potential users. Variation of physical characteristics from user to user can make it difficult for a user to find suitable eyewear requiring the user to try on lots of pairs to find one that is suitable.

In particular, eyewear temple pieces are not capable of desirably contouring the head of each of a large number of users. Improperly contoured temple pieces can result in user discomfort while worn or in falling from the user's head during movement thereof.

Embodiments of the disclosure provide secure eyewear, an eyewear system and a method for donning an eyewear system.

Embodiments of the disclosure substantially eliminate, or at least partially address, problems in the prior art, enabling a user to adapt portions of eyewear temples to their particular anatomy yielding eyewear which fits more securely on the user's head.

Additional aspects, advantages, features and objects of the disclosure will be made apparent from the drawings and the detailed description of the illustrative embodiments construed in conjunction with the appended claims that follow.

It will be appreciated that described features are susceptible to being combined in various combinations without departing from the scope of the disclosure as defined by the appended claims.

Referring now to the drawings, particularly by their reference numbers, FIGS. 1-5 illustrate an eyewear system 100. Eyewear system 100 is configured to provide secure eyewear which better grips the user's head. Eyewear system 100 includes a face piece 110 having a first side which may, for example, hold lens 120 and a second side which may, for example, hold lens 130. A nose rest 113 may be provided between the first and second sides of face piece 110.

A first temple piece 140 extends from a first end 141 hingedly coupled with the first side of the face piece generally along a longitudinal axis 14 to a second end 143. A second temple piece 160 extends from a first end 161 hingedly coupled with the first side of face 110 piece generally along a longitudinal axis 16 to a second end 163. In an example, first temple piece 140 may be coupled with face piece 110 at a first end 111 thereof and second temple piece 160 may be coupled with face piece 110 at a second end 115 thereof substantially remote from first end 111.

A first head grip 150 in the form of a first selectively-shaped extension of first temple piece 140 is configured to, with the nose rest 113 supported by a nose of a user and the first temple piece 140 resting on a first ear of the user, selectively contact a back of a head of the user by transitioning from a first, releasing configuration in which the first head grip 150 extends away from the back of the user's head to a second, gripping configuration in which it contacts the back of the head of the user.

A second head grip 170 in the form of a second selectively-shaped extension of second temple piece 160 is configured to, with the nose rest 113 supported by a nose of a user and the second temple piece 160 resting on a second ear of the user, selectively contact the back of the head of the user by transitioning from the first, releasing configuration in which the first head grip 170 extends away from the back of the user's head to the second, gripping configuration in which it contacts the back of the head of the user.

With the first 140 and second 160 temple pieces substantially parallel and each extending away from face piece 110, head grips 150 and 170 exhibit concavity away from one another in the releasing configuration. It follows that, with first 140 and second 160 temple pieces substantially parallel and each extending away from face piece 110, head grips 150 and 170 exhibit concavity towards one another in the gripping configuration.

Figure 5A:
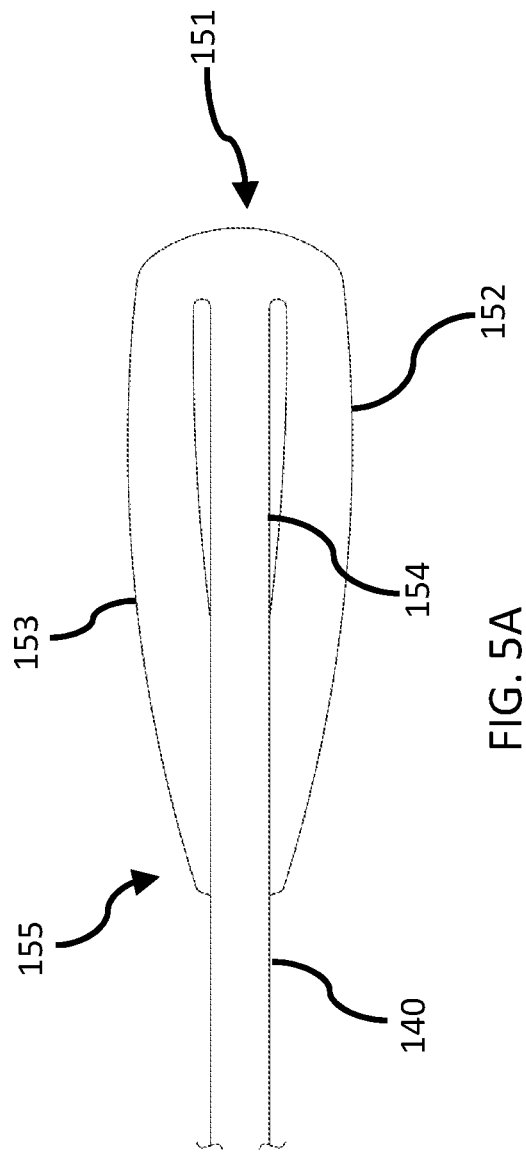
FIG. 5A illustrates an outside detail view of an example extension suitable for use with disclosed eyewear systems.

Referring to FIGS. 5A & B, structure and functionality of head grip 150 will be described in detail. It should be noted that structure and functionality of head grip 170 is substantially identical to that of head grip 150 while being a mirror image thereof and, as such, a separate description of head grip 170 is omitted in the interest of brevity.

Figure 5B:
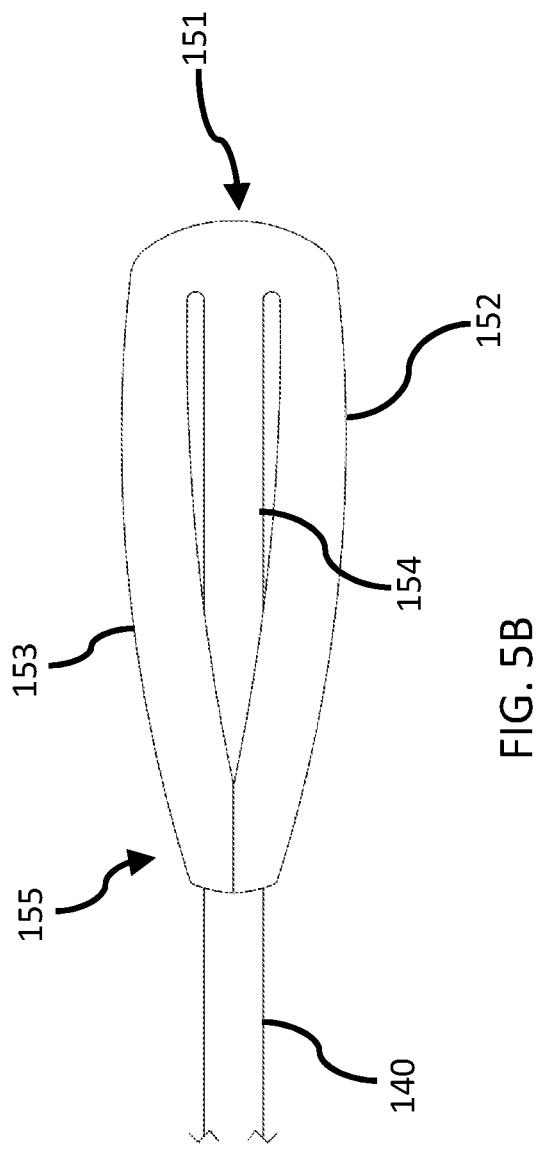
FIG. 5B illustrates an inside detail view of an example extension suitable for use with disclosed eyewear systems.

As shown by way of example in FIGS. 5A & B the first head grip takes the form of a first extension 150 having a first leg 152 extending from a base 151 to a distal end 155, a second leg 153 extending from base 151 to a distal end 155 and a third leg 154 extending from base 151 between the first 152 and second 153 legs to a distal end 155. The third leg 154 is overlapped by the distal end of the first leg 152 and the distal end of the second leg 153. In an example, both the first and second legs overlap third leg 154 on a single side (FIG. 5B). In another example, third leg 154 is overlapped so as to be sandwiched between the first 152 and second 153 legs at distal end 155. In an example, third leg 154 is integrally formed with temple piece 140 and/or manufactured as a single piece. In another example, third leg 154 and first extension 150 are manufactured separately from temple piece 140 and assembled together.

In an example, first head grip 150 exhibits bistability or two equilibrium states and toggles between the first configuration (FIGS. 1 & 3) in which it assumes a convex curvature and extends to a first side of longitudinal axis 14 and the second configuration (FIGS. 2 & 4) in which it assumes a concave curvature and extends to a second side of axis 14. Application of a first force to base 151 substantially along a normal 15 to the convex curvature (normal 17 for 170), toggles first head grip 150 from the first, releasing configuration to the second, gripping configuration. Upon application, to base 151, of a force substantially opposite in direction to the first force, first head grip 150 toggles from the concave curvature to the convex curvature. First head grip 150 is configured to maintain either the convex curvature or the concave curvature while being unstable therebetween such that movement of base 151 from a first position through a threshold angle causes base 151 to snap or accelerate to a second position.

Figure 3:
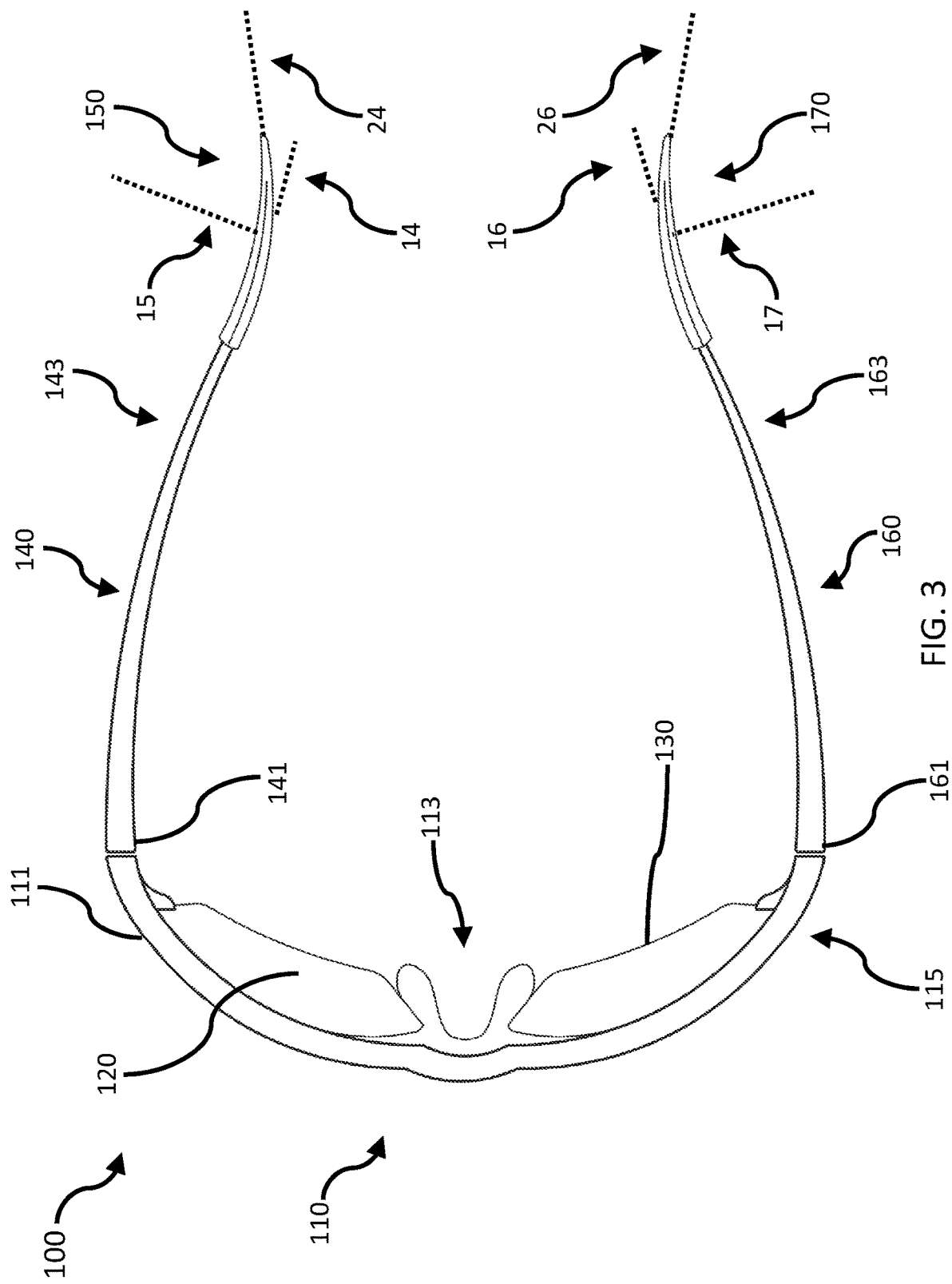
FIG. 3 illustrates a top view of the example eyewear system of FIGS. 1 & 2 with the example extensions in a releasing configuration.
Figure 4:
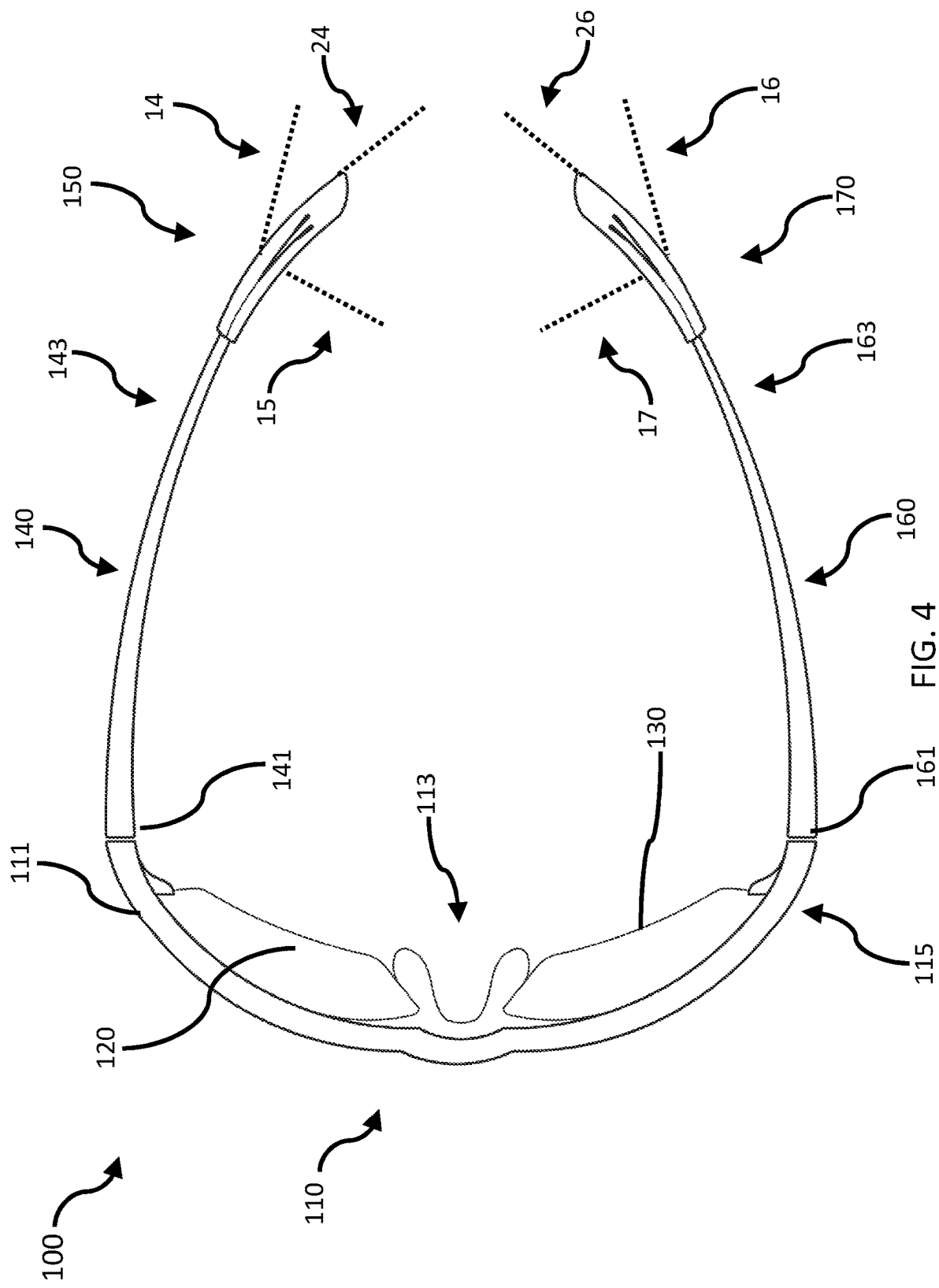
FIG. 4 illustrates a top view of the example eyewear system of FIGS. 1-3 with the example extensions in a gripping configuration.

With temple pieces 140 and 160 folded away from face piece 110, in the releasing configuration, line 24 extending tangent to first head grip 150 from its end diverges from line 26 extending tangent to second head grip 170 from its end as seen in FIG. 3. In the gripping configuration, lines 24 and 26 converge as seen in FIG. 4.

Head grips 150 and 170 may be formed from any of a variety of resilient materials. Example materials include but are not limited to metals, plastics or a combination of these.

The distance between the face piece 110 and first and second head grips 150 and 170 may be adjustable. First temple piece 140 may be configured to enable adjustment of a distance between face piece 110 and distal ends 155 of the first, second and third legs of the first head grip 150. Similarly, second temple piece 160 may be configured to enable adjustment of a distance between face piece 110 and the distal ends of first, second and third legs of second head grip 170. In an example, a portion of each of temple piece 140 and temple piece 160 may be comprised of two overlapping pieces one of which provided with a male detent feature and the other provided with a series of sockets configured to separately accommodate the detent feature to hold the overlapping pieces such that temple pieces 140 and 170 maintain one of a variety of lengths.

Figure 6:
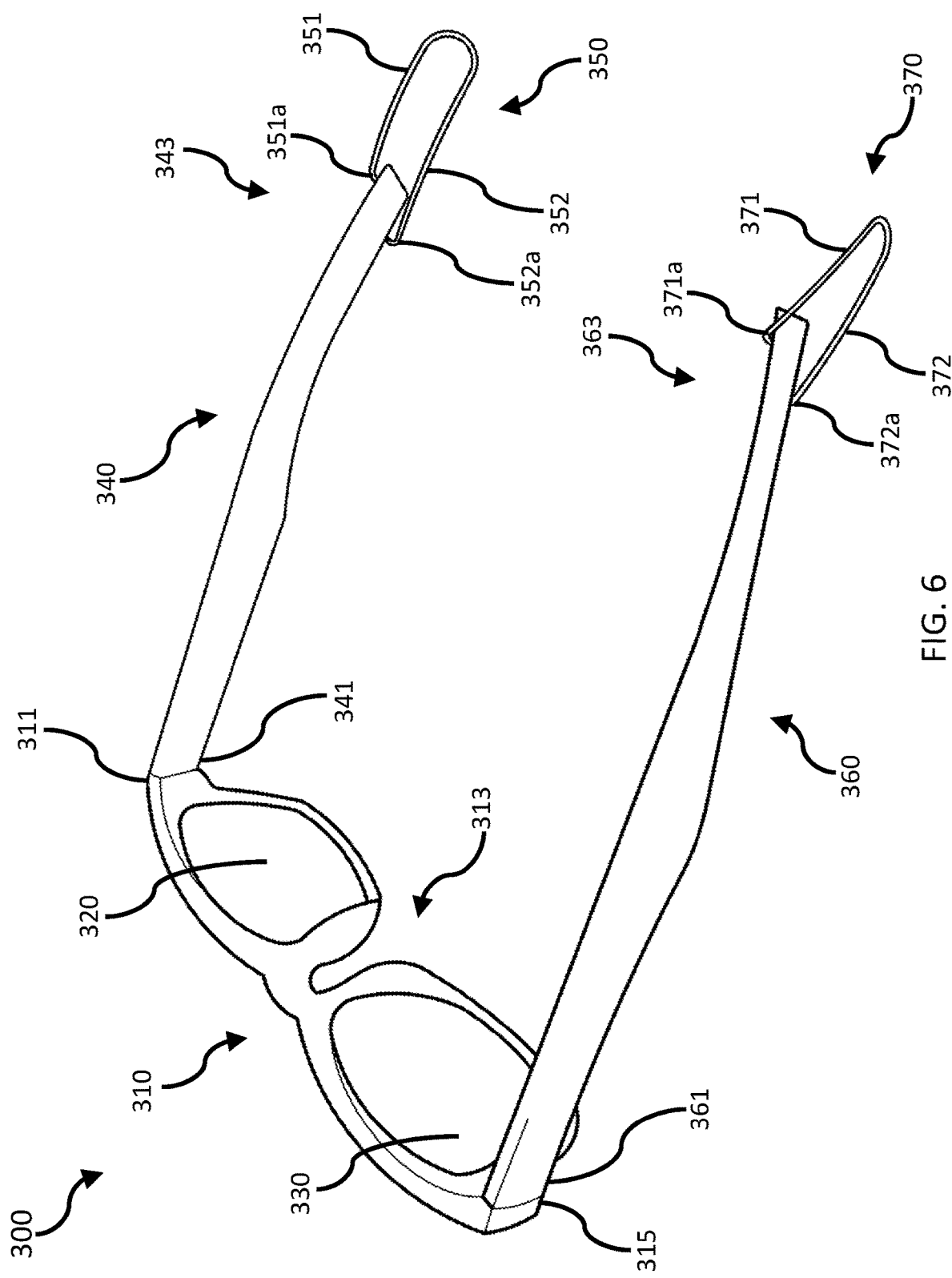
FIG. 6 illustrates a right side, top perspective view of another example eyewear system with example extensions in a releasing configuration.
Figure 7:
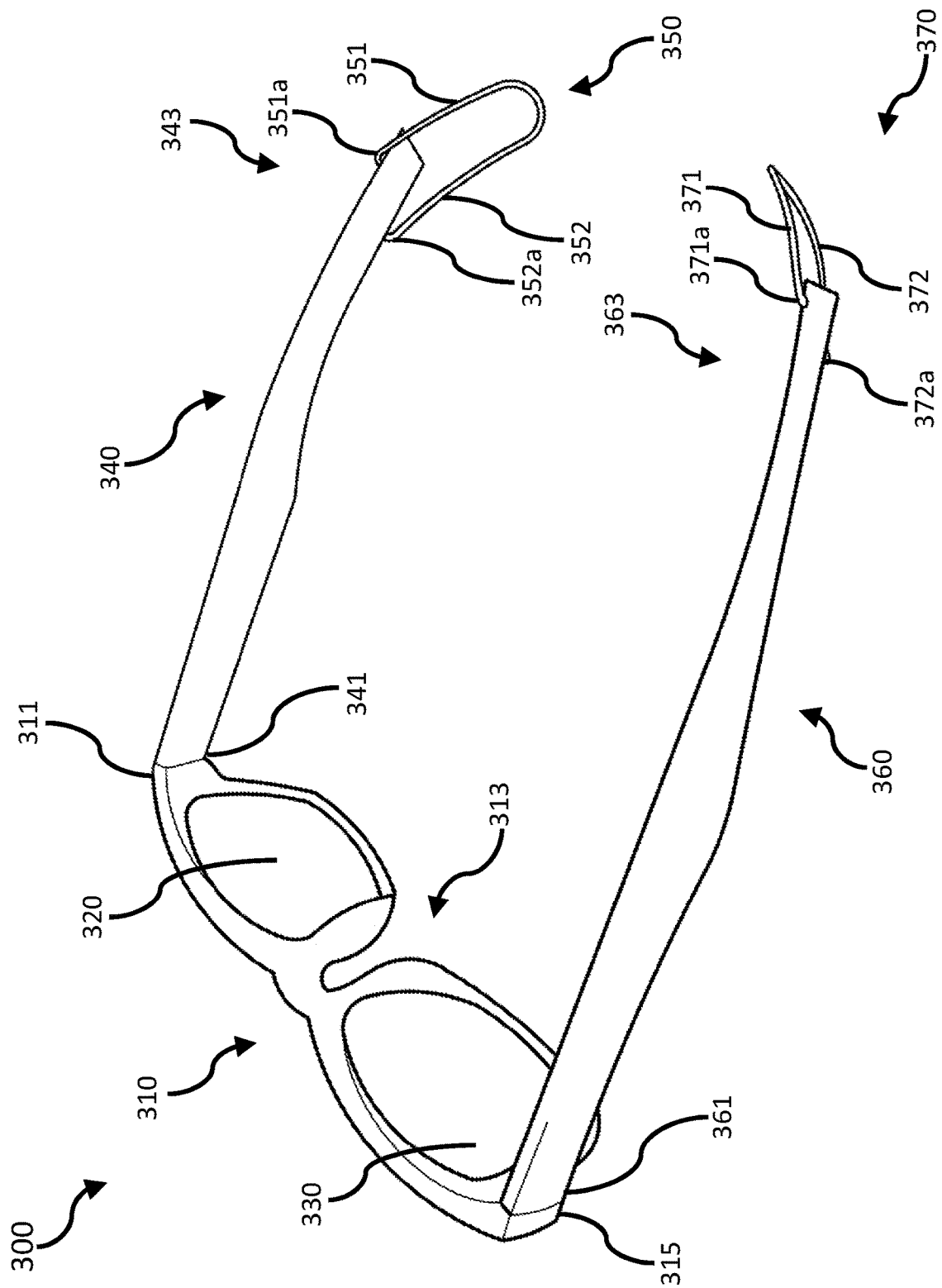
FIG. 7 illustrates a right side, top perspective view of the example eyewear system of FIG. 6 with the example extensions in a gripping configuration.

Referring to FIGS. 6 & 7, in another embodiment, the first head grip may take the form of a wire loop 350 and the second head grip may take the form of a wire loop 370. Eyewear system 300 is also configured to provide secure eyewear which better grips the user's head. Similar to eyewear system 100, eyewear system 300 includes a face piece 310 having lenses 320 and 330. A nose rest 313 may be provided between first and second sides of face piece 310.

First temple piece 340 extends from a first end 341 hingedly coupled with the first side of the face piece generally along a longitudinal axis to a second end 343. Second temple piece 360 extends from a first end 361 hingedly coupled with the second side of the face piece generally along a longitudinal axis to a second end 363. First temple piece 340 may be coupled with face piece 310 at a first end 311 thereof and second temple piece 360 may be coupled with face piece 310 at a second end 315 thereof substantially remote from first end 311.

First head grip 350 has a first leg 351 with a first anchor 351a coupled with first temple piece 340 and a second leg 352 with a second anchor 352a coupled with first temple piece 340 between first anchor 351a and first end 341 of first temple piece 340. First leg 351 has a first length and second leg 352 has a second length longer than the first length.

The second head grip may similarly take the form of a wire loop 370 having a first leg 371 with a first anchor 371a coupled with first temple piece 360 and a second leg 372 with a second anchor 372a coupled with second temple piece 360 between first anchor 371a and first end 361 of second temple piece 360. First leg 371 has a first length and a second leg 372 has a second length longer than the first length.

To provide the toggling action described above with reference to FIGS. 1-5 and also available with eyewear system 300, energy is stored in loops 350 and 370 by deformation thereof such that the distances between anchors 351a and 352a and between anchors 371a and 372a is greater when coupled with respective temple pieces 340 and 360 than when loops 350 and 370 are left to assume equilibrium in isolation. The stored energy causes loops 350 and 370 to assume equilibrium in either of the receiving or gripping configurations when coupled with respective temple pieces 340 and 360.

Head grips 350 and 370 may be formed from any of a variety of resilient materials. Example materials include but are not limited to metals, plastics or a combination of these.

The distance between the face piece 310 and first and second head grips 350 and 370 may be adjustable. First temple piece 340 may be configured to enable adjustment of a distance between face piece 310 and hinge 355 of selectively arcuate extension 350. Similarly, second temple piece 360 may be configured to enable adjustment of a distance between face piece 310 and the hinge of second head grip 370.

The following method for donning secure eyewear is described as a collection of actions in a logical flow. The method includes providing a face piece and first and second temple pieces each including a first end hingedly coupled with the face piece and a second end having a head grip in the form of a selectively-shaped extension.

With the first and second temple pieces substantially parallel and each angled substantially 90 degrees from the face piece so as to provide a space between the respective head grips, the head grips are toggled from a concave curvature to a convex curvature. If the head grips are already in the convex curvature, it will be unnecessary to toggle from the concave curvature to the convex curvature.

With the first temple piece on a first side of a user head and the second temple piece on a second side of the user head opposite the first side, the face piece is moved towards a user face until substantially adjacent thereto and a portion of the first temple piece is supported by a first user ear, at least a portion of the second temple piece is supported by a second user ear and a nose rest is supported by a user nose. The head grips are the toggled from the convex curvature to a concave curvature to partially wrap a portion of the user head.

In the event the user finds the positioning of the selectively-shaped extensions of the temple pieces on the user head to be awkward, uncomfortable or otherwise improper, the distance between the temple piece first ends and the hinges of the selectively-shaped extensions may be adjusted. For example, if the selectively-shaped extensions are positioned too far back on the user's head, the distance between the temple piece first ends and the hinges of the selectively-shaped extensions can be decreased to move the position of the selectively-shaped extensions forward. In another example, if the selectively-shaped extensions are positioned too far forward on the user's head, the distance between the temple piece first ends and the hinges of the selectively-shaped extensions can be increased to move the position of the selectively-shaped extensions backward.

Removing the eyewear system is achieved by generally reversing actions of the method for donning the eyewear system. With the first temple piece on a first side of a user head, the second temple piece on a second side of the user head opposite the first side, the face piece substantially adjacent to a user face, a portion of the first temple piece supported by a first user ear, at least a portion of the second temple piece supported by a second user ear and the nose rest supported by a user nose, the head grips are the toggled from the concave curvature to the convex curvature to unwrap or disengage from the user head. Then, the face piece is moved away from the user face until the first and second temple pieces are away from the first and second user ears and the user's head is no longer between the first and second temple pieces.

The actions described above are only illustrative and other alternatives can also be provided where one or more actions are added, one or more actions are removed, or one or more actions are provided in a different sequence without departing from the scope of the claims herein.

Embodiments of the disclosure are susceptible to being used for various purposes, including, though not limited to, enabling users to adapt portions of eyewear temples to their particular anatomy resulting yielding eyewear which fits more securely on the user's head.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim disclosed features are intended to be construed in a non-exclusive manner, namely allowing for items, components or elements not explicitly described also to be present. Reference to the singular is also to be construed to relate to the plural.

What is claimed is:

1. An eyewear system, comprising:
a face piece including a first side, a second side and a nose rest therebetween;
a first temple piece extending from a first end hingedly coupled with the first side of the face piece to a second end and including a first extension configured to, with the nose rest supported by a nose of a user and the first temple piece resting on a first ear of the user, toggle between a concave curvature and a convex curvature and selectively contact a back of a head of the user; and
a second temple piece extending from a first end hingedly coupled with the second side of the face piece to a second end and including a second extension configured to, with the nose rest supported by the nose of the user and the second temple piece resting on a second ear of the user, toggle between a concave curvature and a convex curvature and selectively contact the back of the head of the user.

2. The eyewear system as set forth in claim 1, wherein the first and second temple pieces each define a longitudinal axis and the first and second extensions are configured to toggle between a first position extending to a first side of the longitudinal axis to a second position extending to a second side of the longitudinal axis.

3. The eyewear system as set forth in claim 1, wherein with the nose rest supported by a nose of a user, the first temple piece resting on a first ear of the user, the second temple piece resting on a second ear of the user, the first extension is configured to toggle between a first position extending away from a back of a head of the user and a second position in contact with the back of the head of the user.

4. The eyewear system as set forth in claim 1, wherein the first extension and the second extension exhibit bistability.

5. The eyewear system as set forth in claim 1, wherein the first temple piece is configured to enable adjustment of a distance between the face piece and first extension.

6. The eyewear system as set forth in claim 1, wherein the second temple piece is configured to enable adjustment of a distance between the face piece and second extension.

7. The eyewear system as set forth in claim 1, wherein the first extension further comprises:
   a first leg extending from a base to a distal end;
   a second leg extending from the base to a distal end; and
   a third leg extending from the base between the first and second legs to a distal end overlapped by the distal end of the first leg and the distal end of the second leg.

8. The eyewear system as set forth in claim 7, wherein the third leg is sandwiched between the first and second legs.

9. The eyewear system as set forth in claim 7, wherein the second head grip further comprises:
   a first leg extending from a base to a distal end;
   a second leg extending from the base to a distal end; and
   a third leg extending from the base between the first and second legs to a distal end overlapped by the distal end of the first leg and the distal end of the second leg.

10. The eyewear system as set forth in claim 9, wherein the third leg of the second head grip is sandwiched between the first and second legs of the second head grip.

11. The eyewear system as set forth in claim 1, wherein with the temple piece folded away from the face piece, in the releasing configuration, a line extending tangent to the first head grip from its end diverges from a line extending tangent to the second head grip from its end while, in the gripping configuration, the lines converge.

12. Eyewear securing system, comprising:
   a face piece;
   hingedly coupled with the face piece, a first head grip in the form of a wire loop having a first leg with a first length and a second leg with a second length different from the first length, the first head grip configured to toggle between a releasing configuration and a gripping configuration; and
   hingedly coupled with the face piece remote from the first head grip, a second head grip in the form of a wire loop having a first leg with a first length and a second leg with a second length different from the first length, the second head grip configured to toggle between a releasing configuration and a gripping configuration.

13. Secure eyewear, comprising:
   a face piece including a first side, a second side and a nose rest therebetween; and
   a temple piece extending from a first end coupled with the first side or the second side of the face piece to a second end and including a first extension configured to, with the nose rest supported by a nose of a user and the first temple piece resting on a first ear of the user, selectively grip a back of a head of the user by transitioning between convex and concave curvatures.

\* \* \* \* \*